Patented July 22, 1924.

1,502,116

UNITED STATES PATENT OFFICE.

JAMES R. O'CONNELL, OF ROCHESTER, NEW YORK, ASSIGNOR OF ONE-HALF TO JOHN O. BENNETT, OF ROCHESTER, NEW YORK.

FEED CHUCK.

Application filed October 19, 1923. Serial No. 669,485.

*To all whom it may concern:*

Be it known that I, JAMES R. O'CONNELL, a citizen of the United States, residing at Rochester, in the county of Monroe and State of New York, have invented certain new and useful Improvements in Feed Chucks, of which the following is a specification.

The object of my present invention is to provide a new and improved form of feed chucks for use in automatic screw machines and other machines in which a chuck of this kind is used.

This and other objects of this invention will be fully illustrated in the drawing, described in the specification and pointed out in the claims at the end thereof.

In the accompanying drawing:

Figure 1 is a side elevation of the improved feed chuck.

Figure 2 is an end elevation of the improved feed chuck.

Figure 3 is a longitudinal sectional view of the feed chuck the section being taken on the line $3^x$—$3^x$ of Figure 1.

Figure 4 is a longitudinal sectional view of the feed chuck, the bushing thereof being shown in the position in which it has to be inserted into the body or withdrawn from the body of the feed chuck.

Figure 5 is an end view of the feed chuck and bushing illustrated in Figure 4.

Figures 6 to 13 inclusive are detail views of a series of bushings and modifications thereof used in connection with the feed chuck.

In the several figures of the drawings like reference numerals indicate like parts.

The feed chuck forming the subject matter of my present invention is an improvement over the feed chucks that are at present used in screw machines for the purpose of feeding the rod stock to be operated upon through the spindle into the collet of the machine and advance this stock through the collet after each cut off operation which severs the finished product from the end of the continuous rod stock. A new section of the rod stock is thus fed into the machine by the feed chuck and held in place therein by the collet ready to have the tools of the machine operate on it.

For this purpose the feed chuck must be constructed in a manner that will provide a firm grip for the chuck on the stock to be fed into the machine. Heretofore such chucks were made of a single piece, that is, the body as well as the gripping members of the chuck were made integral with each other. This necessitated an uneven hardening and tempering of the chuck so that the body thereof was left springy and consequently softer than the gripping member proper which had to have a degree of hardness that would prevent excessive wear thereof. The uneven hardness thus present in the body of the chuck made the chuck weak at the dividing line between its hard and soft section and this eventually caused the breaking of it after a comparatively short life of operation.

The feed chuck forming the subject matter of my present invention overcomes this drawback in the construction of feed chucks by making the body of the chuck and the chuck proper in two parts so that the body of the chuck can be hardened evenly throughout its length to secure the best possible result necessary for the spring action of the chuck while the chuck or gripping members can be hardened to a degree that will prevent a quick wear thereof without in any way weakening any part of the chuck as a whole.

As illustrated in the figures of the drawing the body 1 of the feed chuck is formed up from a section of tubing having a male thread 2 provided at one end thereof and a pair of semicircular gripping fingers 3 and 4 provided at the other end thereof. A collar 5 is formed between the threaded end and the gripping fingers of the chuck and provides a shoulder 6 that is adapted to rest against the end of the feed bar after the chuck is threaded thereto. A pair of holes 7 and 8 allow a handle (not shown) to be inserted into the body of the chuck for the purpose of rotating it to attach the chuck or take it off from the end of the feed bar.

The pair of semicircular gripping fingers 3 and 4 are formed by slitting the body of the chuck for a considerable length thereof and then bringing the slitted ends together at the outer end as illustrated in Figures 1 and 2. The widths of the slits in the body of the chuck thus determines the amount the fingers can spring from their

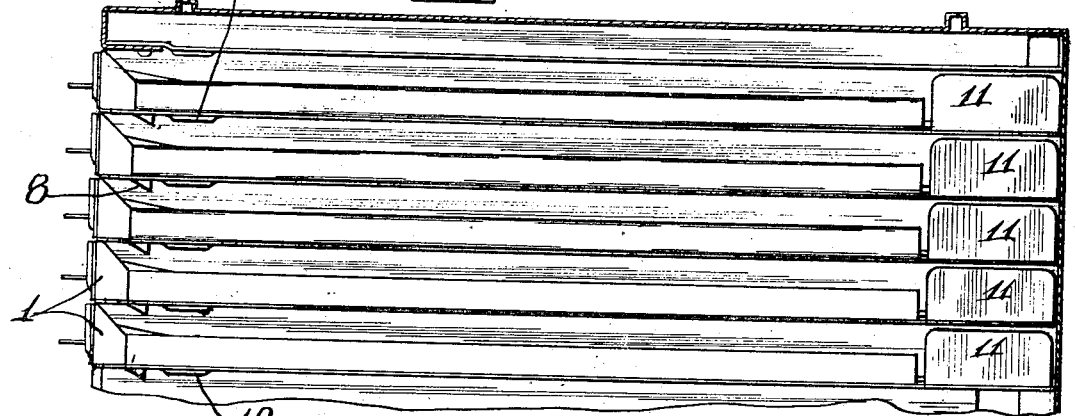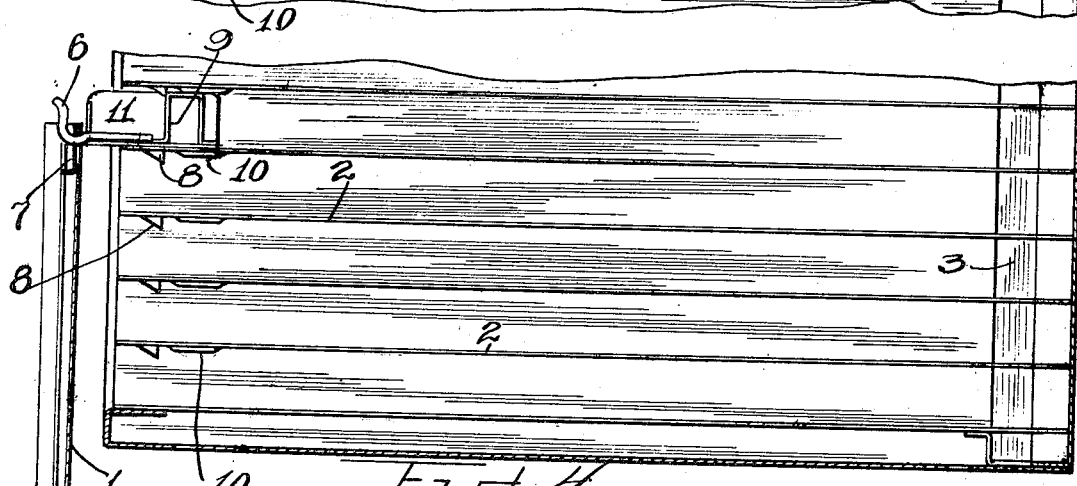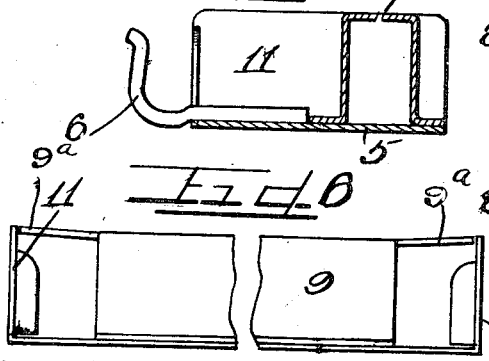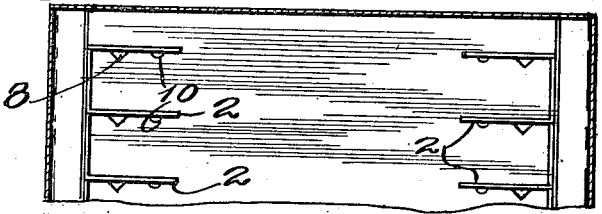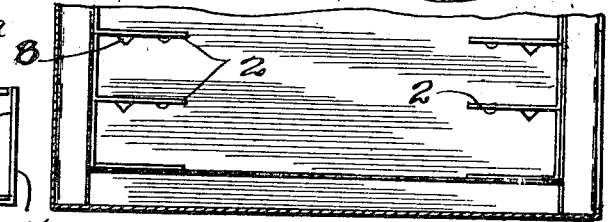

Patented July 22, 1924.

1,502,117

UNITED STATES PATENT OFFICE.

ENOCH OHNSTRAND, OF MOHAWK, NEW YORK, ASSIGNOR TO LIBRARY BUREAU, A CORPORATION OF NEW JERSEY.

CABINET SUCH AS USED FOR VISIBLE INDEX.

Application filed December 5, 1921. Serial No. 520,192.

*To all whom it may concern:*

Be it known that I, ENOCH OHNSTRAND, a citizen of the United States, and a resident of the city of Mohawk, in the county of Herkimer and State of New York, have invented certain new and useful Improvements in a Cabinet such as Used for Visible Index; and I do hereby declare that the following is a full, clear, and exact description of the same, reference being had to the accompanying drawings, and to the numerals of reference marked thereon, which form a part of this specification.

This invention relates to a cabinet which may be made of unit sections and containing filing trays shown as trays for visible index cards.

It is an object of this invention to provide a slidable tray anchor that allows any tray to be supported or partly supported or suspended from the cabinet when the tray is withdrawn from the cabinet and which permits ready detachment of the tray therefrom, said anchor being held in its advanced position until restoration of the tray to position.

It is a further object of this invention to provide a simple and effective structure that readily permits the proper manipulation of the trays for the purpose of examining, and manipulating the contents and in which the anchor is not readily displaced inwardly except by the tray when returned inwardly.

With these and other objects in view which will become more apparent in the following description and the disclosures in the drawing, my invention comprises the novel structure and mechanisms hereinafter described and more particularly pointed out and defined in the appended claims.

In the accompanying drawings which illustrate a preferred embodiment of my invention and in which similar reference numerals refer to similar features in the different views:

Figure 1 is a perspective view of a filing cabinet embodying my invention.

Figure 2 is an enlarged horizontal sectional view broken away illustrating the operation of the slidable anchor.

Figure 3 is an enlarged vertical longitudinal section partly broken in which trays are shown in the upper portion and removed from the lower portion with one tray in suspended position.

Figure 4 is a vertical transverse section taken just back of the front of the cabinet and showing the ends of the ways or supports for the trays in elevation.

Figure 5 is an enlarged vertical longitudinal section through one of the slidable tray anchors.

Figure 6 is an enlarged rear elevation of the anchor.

In the different figures of the drawings, I have illustrated one embodiment of my invention, the same comprising a casing made of metal or other suitable material of such a design as to accommodate the desired size and number of card index or other desired trays together with the slidable anchors therefor. The casing or cabinet as shown is constructed as a unit section though, of course, not necessarily so and is preferably constructed of sheet metal which forms the sides, top, bottom and rear, leaving the front end open for the insertion and removal of the card index trays. These trays are slidably supported upon ways or ledges 2 which in the present instance are illustrated as comprising metal strips bent to afford right angle bars secured in the casing so that the inwardly directed webs afford resilient horizontal ways to receive and support said trays. These angle bars are secured by spot welding or in any suitable manner through their flanges to the vertical inwardly direced flanges of a pair of vertical Z-bars 3, one to each inner side wall of the cabinet near the rear and to the inwardly directed flanges 4 (Figure 2) as shown, integral with the side walls of the casing at the open end thereof. The ways or ledges, when so constructed and mounted, are sustained in spaced relation from the side walls of the cabinet and from an inner structure or frame that, while somewhat resilient as to the ways or ledges, strongly reinforces the cabinet as a whole.

In order to properly anchor a tray from being inadvertently withdrawn from the cabinet so that its rear end might drop and also for the purpose of supporting or suspending the tray on the cabinet while some desired information is sought, cards inserted and removed, or for any other purpose, a slidable tray anchor has been provided for each tray. Each anchor is removably attached to the rear of its respective tray and slides therewith upon the ways or ledges 2 to the tray orifice of the cabinet, but means are provided to prevent the anchor from being wholly withdrawn beyond the casing or more than sufficient to permit the tray to be suspended therefrom by its rear end or to be lifted and removed therefrom as desired.

This anchor and the restraining means therefor may, of course, assume various forms. As a matter of illustration, I have merely shown one form for accomplishing the stated functions. In referring to Figures 2, 5 and 6, it will be observed that the illustrated form comprises a flat member 5 in the form of a metal plate of a length to rest with its ends upon the ledges 2 and provided with flanges 11 to slide against the side walls of the ways. Each member 5 is provided with a hook or hooks 6 affording hinge members on which the trays are detachably mounted, thus affording a separable hinge connection a pair of said hook members secured to the anchor at equal distances from the end thereof, engaging in slots or apertures 7 in the rear portions of the bottom of the trays as shown in Figure 3 which illustrates how the trays may be hingedly suspended from the anchors. Secured on the anchor base plate 5 is a channel-shaped rib 9, the web $9^a$ of which extends at each end to bear yieldingly and flat beneath its ways or ledges 2 next above those on which the anchor plate slides. The flanges of the channel are shorter and are secured to the base 5 by spot welding or in any suitable manner.

In said Figure 3, one of the anchors is shown at the outer limit of its travel, which permits the anchor hooks 6 to protrude sufficiently beyond the cabinet to suspend the tray freely therefrom.

For thus arresting each anchor, abutments or stops are formed on the under side of each way or ledge, struck down from the metal forming the ledge or way to engage the extended end of the web $9^a$ of the anchor.

When the tray is withdrawn from its place and removed from its hinge connection with its anchor, it is desirable to hold the anchor in its advanced position to again receive the tray thereon preparatory to returning the tray into the cabinet. Otherwise, the operator might knock the anchor inwardly out of position to receive the tray thereon in hinged relation. Accordingly, I have provided a frictional or braking surface 10 on the lower surface of each way or ledge next above each anchor and laterally inward from and at the rear of the projections 8 thereon, which braking surface comes in contact with and bears upon the upper surface of the extended ends of the web $9^a$ and produces a frictional retardation which holds the anchors at the forward limits of their travel while the tray is being replaced. In the present embodiment of my invention, I have stamped elongated depressions in the upper surfaces of the resilient ledges to produce these braking or frictional surfaces, which together with the resilient ends of the web $9^a$ yield with a frictional retardation upon the abutments 8 as they pass thereunder, effectively holding the anchor while replacing the tray thereon.

In using a cabinet constructed according to my invention, it is contemplated that a tray 1 may be grasped by the finger grips 12 and the tray withdrawn from the casing until its anchor is arrested by the projecting abutments 8 as shown in Figures 2 and 3; the tray may then be removed from its hinge connection with its anchor, or it may be suspended therefrom as shown in Figure 3 or in any inclined position as desired for the ready insertion or examination of index cards or for making entries or any other purpose. The anchor offering such resistance as is desirable in manipulating the tray prevents accidental withdrawal and affords a better support for the rear end of the tray when in inclined position and is readily pushed inward by the tray when desired.

It will be obvious that a cabinet thusly constructed greatly facilitates the use of the visible index system of cards in which the cards are removably sustained in the trays in overlapping relation, and can be readily examined when the tray is in suspended form. It should, however, be understood that the use of my novel cabinet is not restricted to any particular form of index card system and may be readily used and adapted for different filing purposes.

I am aware that numerous details of construction may be varied through a wide range without departing from the principles of this invention, and I therefore do not purpose limiting the patent granted otherwise than necessitated by the prior art.

I claim as my invention:

1. In a filing cabinet, the combination with a plurality of vertically spaced tray supporting ledges, of a tray slidably supported on one of said ledges, an anchor removably hinged to said tray and slidable therewith, cooperating abutments on said anchor and one of said ledges for arresting the combined tray and anchor at a predetermined position, and frictional retarding means effective to hold said anchor in said predetermined position.

2. In a filing cabinet, the combination with upper and lower ledges, the upper ledge having stops and resilient frictional braking surfaces at the rear of said stops, a tray slidable upon said lower ledges, an anchor hinged to the rear of said tray and having a raised abutment adapted for yieldingly passing under said braking surfaces and be arrested by said stops.

3. In a filing cabinet, the combination with a tray compartment, a tray slidable in said compartment, an anchor removably hinged to the rear of said tray, coacting means on said anchor and in said compartment for arresting said tray and anchor at a predetermined position, and resilient frictional braking means co-operating with said anchor for temporarily holding said anchor in said predetermined position.

4. In a filing cabinet, a tray compartment, a tray slidable in said compartment, a slidable anchor removably hinged to the rear of said tray, means coacting with said anchor for arresting the same in a predetermined position, and means for exerting a frictional braking action upon said anchor in said predetermined position.

5. In a filing cabinet, a tray compartment comprising upper and lower ledges, said ledges having downwardly struck stops and braking surfaces in the rear of said stops, a tray slidable in said compartment, and an anchor hinged to the rear of said tray having a raised abutment adapted for coaction with both said braking surface and said stops.

In testimony whereof I have hereunto subscribed my name in the presence of two subscribing witnesses.

ENOCH OHNSTRAND.

Witnesses:
H. J. SYREU,
E. CONGELTON.